Aug. 25, 1959      T. E. NOAKES      2,901,578
DUAL SWITCH ACTUATING DEVICE
Filed Nov. 14, 1957      2 Sheets-Sheet 1
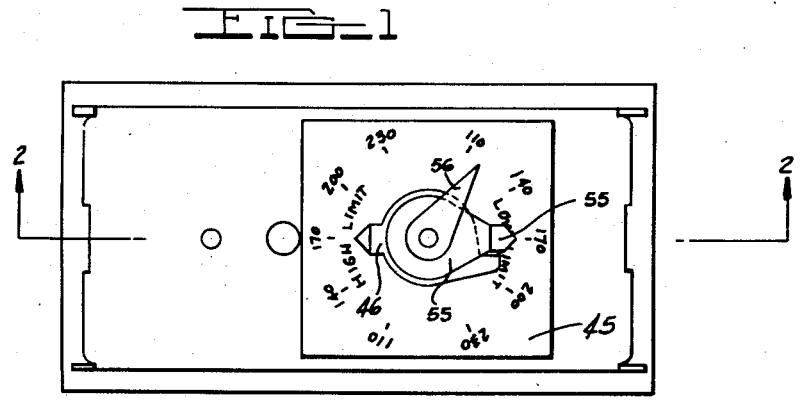
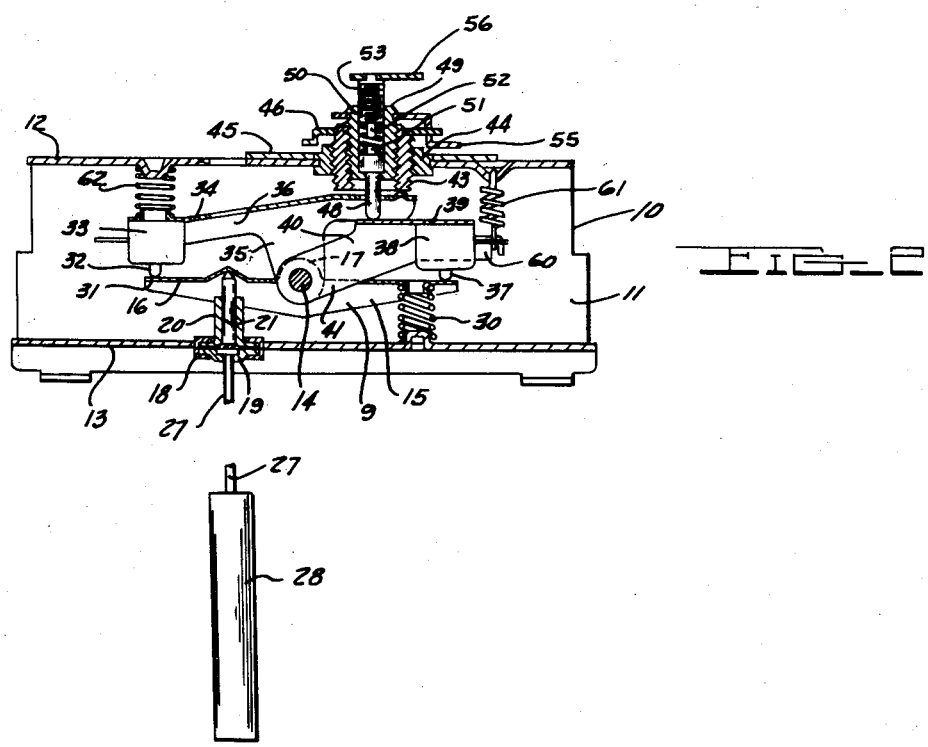
INVENTOR.
THOMAS E. NOAKES
BY
SMITH, WILSON, LEWIS & MCRAE

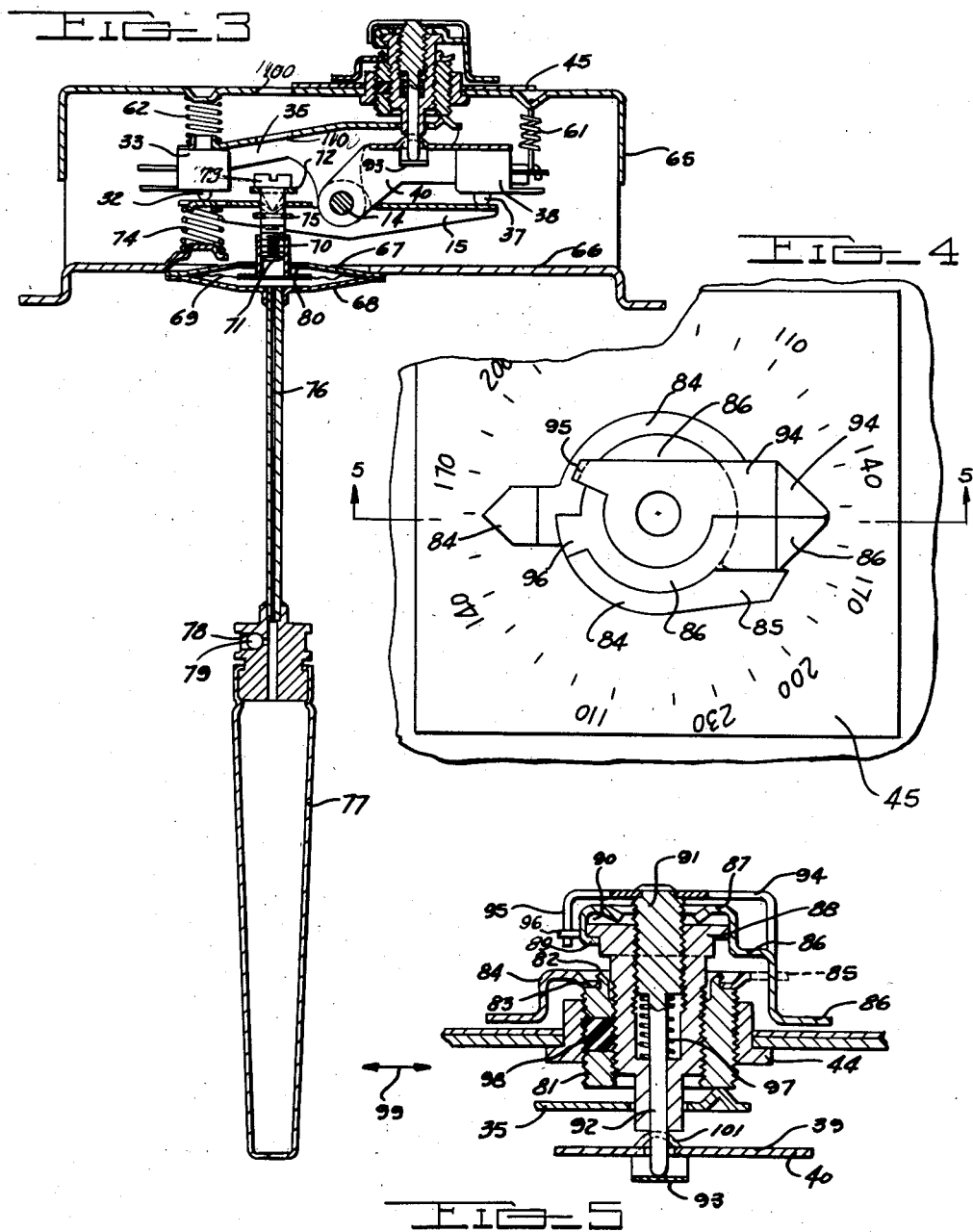

United States Patent Office 2,901,578
Patented Aug. 25, 1959

2,901,578

DUAL SWITCH ACTUATING DEVICE

Thomas E. Noakes, Detroit, Mich., assignor to American Radiator & Standard Sanitary Corporation, New York, N.Y., a corporation of Delaware Application November 14, 1957, Serial No. 696,380

15 Claims. (Cl. 200—140)

This invention relates to switch actuating mechanisms, and more particularly to an improved mechanism for actuating dual switches controlled by temperature responsive means in such a manner that each of the switches may be operated at a desired temperature bearing a predetermined relation to the temperature at which the other switch is operated.

In the operation of various devices such, for example, as household appliance devices including washing machines, it is desirable that various functions be carried out at dicerent temperatures. In such instances, it is desirable that each of a pair of switches be operable to control its associated device when the temperature of a control member reaches a predetermined temperature, means being provided to permit adjusting the temperature at which the device is rendered operable. For example, in the home laundry field, it is desirable that a soaking cycle be provided to permit soaking the laundry within a substantially predetermined temperature range, and that the washing cycle be performed within a different substantially predetermined temperature range. It is desirable that individual adjustments be provided to control the temperature of the water in each cycle.

In the operation of such devices I have found that less confusing controls are provided if the levers controlling the various devices are concentrically disposed in such a manner that their associated pointers indicate with a reference to a single dial the temperature at which the device is set to function.

An object of my invention is to provide a dual switch control mechanism so constructed and arranged that each of a pair of individual switches can be set to operate at the same temperature or different temperatures in accordance with the settings of a pair of manually adjustable pointer devices.

A further object of my invention resides in the provision of concentrically mounted dual switch control elements operably connected in such a manner that an outer-threaded member controls the temperature at which one of the switches will be operated and an inner-threaded member controls the temperature at which the other switch will be operated, a stop member being provided to prevent one of the switches from being set to operate at a temperature lower than the other.

Another object is to provide a control mechanism for a pair of switches wherein each of the switches is capable of operating at temperatures which can readily be ascertained by reference to the position of indicators relative to a common scale.

Yet another object of my invention is to provide a differential adjustment including a spring-loaded plunger controlled by threaded members to vary the range of temperatures at which each of two switches will function.

Still a further object of my invention is to provide an improved differential force transmitting mechanism for varying the temperature at which a pair of dual switches will be successively cut in and cut out of operation.

Yet another object of my invention resides in the provision of a simplified dual switch control mechanism which may be more economically manufactured than similar devices heretofore used, and wherein separately operable control members are provided to vary the temperature at which each of a pair of dual switches will be successively rendered inoperative and operative, indicating pointers in association with a single dial having temperature graduations marked thereon being employed to readily indicate to the operator the approximate temperature at which each of the switches will be operative.

Other objects and advantages of my invention will be apparent from the following detailed description considered in conjunction with the accompanying drawings submitted for purposes of illustration only, and not intended to define the scope of this invention, reference being had for that purpose to the subjoined claims.

In the drawing, wherein similar reference characters refer to similar parts throughout the several views:

Fig. 1 is a top plan view illustrating one embodiment of my improved switch operating mechanism.

Fig. 2 is a sectional view on line 2—2 in Fig. 1.

Fig. 3 is a view similar to Fig. 2 but of a second embodiment of the invention.

Fig. 4 is a fragmentary top plan view of the Fig. 3 structure.

Fig. 5 is an enlarged fragmentary view taken in the same direction as Fig. 3 but illustrating details not easily visible in Fig. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1 and 2 of the drawings, there is shown a casing 10 including side walls 11, top wall 12, and removable bottom wall 13. A shaft 14 fixedly extends between the two casing side walls.

Extending at right angles to shaft 14 is a lever 15 which includes a web 16 and downturned side flanges 9, only one of which is visible in Fig. 2. Portions of web 16 are cut and turned upwardly to form ears 17, which serve to pivotally mount lever 15 on shaft 14.

The bottom wall 13 carries a casing 18 in which is clamped an elastomeric diaphragm 19. Casing 18 includes a guide sleeve 20 which slidably mounts a piston 21. The upper end of piston 21 seats in a conical depression formed in lever web 16.

Casing 18 is connected to a capillary tube 27 which leads to a thermal bulb 28. In operation, temperature increase in the fluid in bulb 28 causes the capillary tube fluid to flex diaphragm 19 upwardly so as to cause piston 21 to rock lever 15 in a clockwise direction about the axis of shaft 14. During temperature decrease of bulb 28 a compression spring 30 forces lever 15 in a counterclockwise direction in accordance with the amount of contraction experienced within the bulb.

Left end portion 31 of lever 15 engages the trigger pin 32 of a switch 33 carried by the web 34 of a lever 35. Lever 35 includes downturned flanges 36 which are contoured to mount the lever for pivotal movement on shaft 14. The right end portion of lever 15 engages the trigger pin 37 of a switch 38 carried by the web 39 of a lever 40. Lever 40 includes downturned flanges 41 which are contoured to mount the lever for pivotal movement on shaft 14. Switches 33 and 38 are of the conventional "snap-action" type, as for example shown in U.S. Patent 2,669,618.

The right end section of the illustrated lever flange 41 is extended beyond the web 39 to form a hook 60 for mounting one end of a tension spring 61. A compression spring 62 is positioned on the upper face of lever 35. By the arrangement of springs 61 and 62 levers 40 and 35 are independently biased for counterclockwise movement around shaft 14.

The right end portion of lever 35 engages the lower end of a threaded sleeve 43 which is adjustably carried in a bushing 44 fixedly carried on a dial plate 45. A pointer 46 is affixed to sleeve 43 for indicating the sleeve position.

Web portion 39 of lever 40 abuts against a plunger 48 which is slidably carried in a second externally threaded sleeve 49. A light compression spring 50 is positioned between plunger 48 and a threaded plug 53. Plunger 48 and plug 53 are provided with opposed extensions 51 and 52 which are adapted to strike one another when a sufficient upward force is exerted on the plunger to overcome the biasing force of spring 50. Sleeve 49 and plug 53 carry pointer structures 55 and 56 for indicating their respective positions.

In operation of the Fig. 2 structure, when the temperature of bulb 28 is increased lever 15 is rocked clockwise around shaft 14 to move trigger 32 into switch housing 33 and thereby actuate the switch.

During the initial portion of the clockwise movement of lever 15 plunger extension 51 moves away from contact with extension 52 under the force of spring 50. Spring 50 is designed (1) to exert a lesser force than the force required to actuate trigger 37 upwardly but (2) to exert a greater force than the force stored up in the switch blade (within casing 38) by upward movement of trigger 37. This "stored up" force is sometimes referred to as the "release" force.

Because of the character of spring 50 the initial clockwise movement of lever 15 is accompanied by a downward movement of plunger 48 (to its illustrated position) without any movement of trigger 37 relative to lever 40. Thus switch 38 remains in an "actuated" state until plunger 48 reaches its illustrated position.

On reaching its illustrated position, continued clockwise movement of lever 15 is effective to allow trigger 37 to be moved downwardly out of casing 38 under the influence of the aforementioned "release" force. The bulb temperature at which release of the switch 38 contacts takes place is determined by the adjusted position of sleeve 49 (as indicated by pointer 55).

During the initial cooling of bulb 28 trigger 37 is not driven upwardly into casing 38 until after plunger 48 has been driven upward sufficiently to place extensions 51 and 52 in contact with one another. Since the extent of upward movement of plunger 48 is determined by the amount of temperature decrease in bulb 28 it will be seen that adjustment of plug 53 is effective to control the temperature at which switch 38 is actuated. The adjusted position of plug 53 is indicated by pointer 56.

In summary, pointer 56 indicates the "actuation" temperature for switch 38 (during increase in the bulb 28 temperature), and pointer 55 indicates the "release" temperature for switch 38 (during decrease in the bulb 28 temperature). The difference between the adjusted settings of pointers 55 and 56 is commonly referred to as "temperature differential" of the switch.

Referring now to switch 33, during temperature increase in bulb 28 lever 15 drives trigger 32 into housing 33 so as to actuate the concealed switch blade. During temperature decrease in bulb 28 spring 30 drives lever 15 counterclockwise so as to allow trigger 32 to move downwardly for releasing the switch blade. The actuation temperature for switch 33 is controlled by the position of sleeve 43 as indicated by the position of pointer 46. Turning of sleeve 43 downwardly in bushing 44 raises the switch actuation temperature. It will be understood that adjustment of switch 33 is independent of the adjustment of switch 38.

Referring now to Figs. 3 through 5 of the drawings, there is shown a casing 65 having a removable bottom wall 66, on which is secured two dish-shaped discs 67 and 68. A corrugated metal diaphragm 69 is clamped between the discs and carries a threaded sleeve 70, which adjustably mounts a screw 71. A U-shaped bracket 72 is positioned between screw head 73 and an E ring 75 for non-bindingly attaching the screw to the right end of lever 15. Lever 15 is rockably mounted on a fixed shaft 14, and is urged in a clockwise direction by means of a compression spring 74.

Disc 68 connects with a capillary tube 76, which leads to a thermal bulb 77 charged with oil or other thermally expansible fluid. In manufacture of the apparatus the subassembly of discs 67, 68, diaphragm 69, sleeve 70, tube 76, and bulb 77 is positioned in a charging tank, and is evacuated through passage 78 to about ten microns. With diaphragm 69 in a depressed position the bulb and tube are charged with oil, and a sealing ball 79 is inserted into passage 78 to hold the vacuum. The resultant power element construction is such that when the bulb temperature is decreased atmospheric pressure acts through opening 80 downwardly on the upper face of diaphragm 69 to depress it. During bulb temperature increase the oil expands to elevate diaphragm 69 and permit spring 74 to rock lever 15 clockwise. The arrangement is such that lever 15 is continuously maintained in engagement with the knife edges of bracket 72; thus there is no lost motion between screw 71 and lever 15.

Shaft 14 rockably mounts two levers 35 and 40, which carry switches 33 and 38 having triggers 32 and 37. The two levers are urged in counterclockwise directions by means of a compression spring 62 and a tension spring 61.

Lever 35 abuts against a threaded sleeve 81 which is adjustable in a fixed bushing 44. The upper end of sleeve 81 is provided with an annular flange 82 and annular shoulder 83 for mounting a pointer 84. Four radial slots are formed in the inner annular surface of pointer 84 for receiving staked over portions of flange 82 so as to prevent relative rotation between the sleeve and pointer. The portions of flange 82 which are not received in the slots are staked onto the upper face of the pointer to prevent the pointer from being inadvertently lifted off of the sleeve. The right end portion 85 of the pointer is extended laterally to form a stop portion for coaction with another pointer 86. For illustration purposes the end portion 85 is shown in dotted lines in Fig. 5, but it will be appreciated from the section line in Fig. 4 that portion 85 in actual practice would not be visible in Fig. 5.

Pointer 86 includes an annular section 87 which is positioned on the upper face of a threaded sleeve 88. Tab portions 89 are turned beneath the upper flange on sleeve 88 to hold the pointer on the sleeve. During the assembly operations sleeve 88 is adjusted to a properly calbirated position, after which portions of annular pointer section 87 are staked down into screw driver slot 90 so as to prevent any rotation of pointer 86 on sleeve 88.

Adjustably positioned within sleeve 88 is a screw 91 having a plunger-like extension 92 extending into engagement with a light leaf spring 93 carried by web portion 39 of lever 40. A compression spring 97 biases screw 91 upwardly to prevent any play between the meshing threads of the screw and adjacent sleeve.

Screw 91 fixedly carries a pointer structure 94, the left end of which is turned downwardly to form a stop 95 having coaction with an extension 96 on pointer 86 to limit the temperature differential between pointers 86 and 94.

The present apparatus is of such design that in normal usage pointers 84 and 86 are seldomly moved from their fixed positions. Accordingly it is desirable that they have a tight fit in bushing 40 in order to prevent them from becoming inadvertently jarred or loosened from their set positions. For this reason there is provided a cylindrical rubber plug 98, the flat ends of which engage the threads on bushing 44 and sleeve 88 so as to frictionally retard any undesired loosening of sleeves 81 and 88. The length of plug 98 in the arrow 99 direction is approximately equal to the root diameter spacing between the threads on members 44 and 88 so as to enable the plug to exert the required drag on the two sleeves.

In calibrating the Fig. 3 apparatus sleeve 81 is initially adjusted to put its lower end a predetermined distance above the axis of shaft 14. Pointer 84 is then set at a predetermined location, as for example 170° F. on the left scale. Thereafter flanges 82 are staked over to lock pointer 84 on its sleeve 81. The apparatus is then positioned with bulb 77 in a 170° F. water bath, and screw 71 is adjusted (by insertion of a screw driver through openings 100 and 110) so that switch 33 is just actuated at that temperature (i.e. trigger 32 is just forced into housing 33).

Sleeve 88 is then adjusted until its lower end moves lever 40 sufficiently to just release the blade of switch 38 at the 170° F. temperature. Pointer 86 is then set at 170° F. on the right scale, and annular portions 87 are staked into slot 90 to lock pointer 86 on its sleeve.

Calibration of screw 91 may be effected by immersing bulb 77 in a bath of a different temperature, as for example 160° F., and adjusting screw 91 until trigger 38 just releases its switch blade. Pointer 94 is then fixedly secured on screw 91 with its indicator end set at 160° F. on the right scale. It will be understood that spring 93 in the Fig. 3 embodiment has the same function as spring 50 in the Fig. 2 embodiment, namely to provide a lost motion connection during clockwise movement of lever 15. During the initial portion of the clockwise motion spring 93 acts on plunger 92 to force lever 40 in a clockwise direction, whereby to keep trigger 37 engaged with the lever 15; during this time the upwardly extending portions 101 of web portion 39 are caused to leave the sleeve 88. After continued clockwise movement of lever 15 spring 93 is unable to exert sufficient force to maintain trigger 37 engaged with lever 15; as a result the "release" force within housing 38 is enabled to release trigger 37.

The illustrated dual action switch structures are useful in many applications, as for example in washing machines where it is necessary to maintain a tub of water at a constant temperature. The structures give economy of operation since the circuitry provides for control of the water temperature to fill the tub and then switches the control to a heater to maintain the temperature. A float switch or timer can be used to switch in the heater.

I claim:

1. A dual switch actuating mechanism comprising a casing; a shaft in the casing; a pair of oppositely directed arms pivotally mounted on the shaft; a switch carried by each of the arms; trigger pins for actuating each of the switches; lever means for actuating the trigger pins; concentrically mounted threaded adjusting means carried by the casing for limiting angular movement of said arms on the shaft; said adjusting means comprising an outer sleeve engaged with one of the arms and threaded in the casing, and an inner sleeve engaged with the other arms and threaded in the outer sleeve; said inner sleeve having opposed plug and plunger members therein; and yielding means interposed between said plug and plunger members.

2. In a mechanism for actuating sequentially operable devices the combination comprising a shaft; oppositely extending arms pivotally mounted on said shaft; a switch carried by each of said arms; concentrically disposed threaded members controlling the angular position of each of said arms; yielding means urging the arms into engagement with respective ones of said threaded members; trigger means for actuating each of said switches; and a switch-operating lever oscillatingly associated with said shaft and movable angularly in opposite directions to actuate said trigger means.

3. In a mechanism for actuating separately operable devices the combination comprising a pair of arms; means mounting said arms for pivotal movements; a switch carried by each of said arms; concentrically disposed manually operable adjusting means controlling the angular position of each of said switch-carrying arms; trigger means for actuating each of said switches; a switch-operating lever; and means mounting said lever for angular movements in opposite directions to actuate the trigger means of each of said switches.

4. A dual switch mechanism comprising a casing; first and second arms therein; means mounting said arms for pivotal movements; first and second switches carried by respective ones of said arms; first and second trigger means for actuating respective ones of said switches; concentrically disposed manually operable adjusting means carried by the casing for limiting angular movement of the arms to control operation of the switches; said adjusting means comprising a sleeve engaged with the first arm and threaded in the casing, and an abutment mechanism engaged with the second arm and threaded in the sleeve; and a switch-operating lever movable angularly in opposite directions to actuate said first and second trigger means.

5. The combination of claim 4 and further comprising a temperature-responsive power element engaged with the lever to move it angularly for actuating the switches.

6. The combination of claim 5 wherein the power element comprises a diaphragm, a threaded member carried by said diaphragm, and a second threaded member adjustably engaged therewith; a pair of recesses formed in said lever; and a U-shaped bracket carried by the second threaded member and configured to form knife edges engaged in the recesses to form a non-binding connection between the lever and second threaded member.

7. The combination of claim 4 and further comprising a leaf spring carried by said second arm; said abutment mechanism including a plunger in engagement with the leaf spring to maintain the second trigger means in engagement with the lever during a predetermined movement of the lever away from the second switch.

8. The combination of claim 4 and further comprising spring means for maintaining the second trigger means in engagement with the lever during a predetermined movement of the lever away from the second switch; said abutment mechanism including a plunger for transmitting the spring means force to the second arm during the aforementioned predetermined movement.

9. The combination of claim 4 wherein the abutment mechanism includes a second threaded sleeve; a plug adjustably carried in said second sleeve; a plunger slidably carried in the second sleeve and engaged with the second arm; an extension on the plunger abuttable against the plug; and spring means urging the plunger away from the plug to maintain the second trigger means in engagement with the lever during a predetermined movement of the lever away from the second switch.

10. The combination of claim 4 and further comprising a friction plug extending completely through the wall of the sleeve into frictional engagement with the threads on the casing and abutment mechanism.

11. The combination of claim 4 wherein an end portion of the abutment mechanism is configured to provide an exposed annular flange, the combination further comprising a screw driver slot formed in said end portion; a pointer structure having an annular section seated on the face of said end portion and overlying the slot; and tabs extending from the annular section onto the opposite annular surface formed by the flange to retain the pointer structure against being lifted off of the abutment mechanism; portions of said annular section being staked into the screw driver slot to prevent relative rotation between the pointer structure and flange.

12. The combination of claim 4 wherein the sleeve is provided with an annular flange projecting from one of its ends to define an annular shoulder; the combination further comprising a pointer structure having an annular section seated on the shoulder; said annular section being formed with a plurality of slots therein; and said annular flange being staked onto said annular section, with portions thereof entering the slots to prevent relative rotation between the pointer structure and sleeve; the remaining portions of said flange overlying the annular section to prevent the pointer structure from being lifted off of the sleeve.

13. The combination comprising switch means; a lever movable angularly to actuate said switch means; a temperature-responsive power element for moving the lever; said power element comprising a diaphragm, a threaded member carried by said diaphragm, and a second threaded member adjustably engaged with the first mentioned threaded member; a pair of recesses formed in said member; and a U-shaped bracket carried by said second threaded member and configured to form knife edges engaged in the recesses to form a non-binding connection between the lever and second threaded member.

14. The combination comprising first and second movable switch supporting structures; concentrically disposed manually operable adjusting means for engaging the switch supporting structures to vary the switch operating positions; said adjusting means comprising an axially adjustable sleeve engaged with the first switch support structure, and an abutment mechanism engaged with the second switch support structure and threaded in the sleeve; an end portion of the abutment mechanism being configured to provide an exposed annular flange; said end portion having a screw driver slot formed therein; an indicator structure having an annular section seated on the face of said end portion and overlying the slot; and tabs extending from the annular section onto the opposite annular surface formed by the flange to retain the indicator structure against being lifted off the abutment mechanism; portions of said annular section being deformed into the screw driver slot to prevent relative rotation between the indicator structure and the flange.

15. The combination comprising first and second movable switch supporting structures; concentrically disposed manually operable adjusting means engageable with said switch supporting structures to vary the switch operating positions; said adjusting means comprising an axially adjustable sleeve engaged with the first switch support structure, and an abutment mechanism engaged with the second switch support structure and threaded in the sleeve; said sleeve being provided with an annular flange projecting from one of its ends to define an annular shoulder, an indicator structure having an annular section seated on the shoulder; said annular section being formed with a plurality of slots therein; and said annular flange extending onto said annular section, with portions thereof entering the slots to prevent relative rotation between the indicator structure and sleeve; other portions of said flange overlying the annular section to prevent the indicator structure from being lifted off of the sleeve.

References Cited in the file of this patent

UNITED STATES PATENTS

| | | |
|---|---|---|
| 2,355,975 | Henrici | Aug. 15, 1944 |
| 2,520,370 | Offutt | Aug. 29, 1950 |
| 2,741,682 | Schwaneke et al. | Apr. 10, 1956 |
| 2,758,178 | Eskin | Aug. 7, 1956 |
| 2,778,575 | Kucera | Jan. 22, 1957 |